(12) United States Patent
Levesque et al.

(10) Patent No.: US 8,005,443 B1
(45) Date of Patent: Aug. 23, 2011

(54) DESIGN FOR TESTABILITY CIRCUITRY FOR RADIO FREQUENCY TRANSMITTER CIRCUITRY

(75) Inventors: Chis Levesque, Fountain Valley, CA (US); Joseph H. Colles, Bonsall, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 1016 days.

(21) Appl. No.: 11/774,952

(22) Filed: Jul. 9, 2007

(51) Int. Cl.
H04B 17/00 (2006.01)
(52) U.S. Cl. .............. 455/115.2; 455/67.14; 455/127.2
(58) Field of Classification Search .............. 455/67.11, 455/67.14, 115.1, 115.2, 115.3, 127.1, 127.2, 455/127.5
See application file for complete search history.

(56) References Cited

U.S. PATENT DOCUMENTS

| 2004/0120392 A1* | 6/2004 | Searles et al. ................. 375/219 |
| 2006/0028894 A1* | 2/2006 | Brennan et al. ............ 365/225.7 |
| 2006/0242499 A1* | 10/2006 | Volz .............................. 714/724 |

* cited by examiner

*Primary Examiner* — Nhan Le
(74) *Attorney, Agent, or Firm* — Withrow & Terranova, P.L.L.C.

(57) ABSTRACT

The present invention is design for testability (DFT) circuitry used with RF transmitter circuitry to enable RF parameter adjustments, which provide compliance with requirements, to configure the RF transmitter circuitry for a particular application or range of applications, and to permanently store adjustment information, configuration information, or both, in non-volatile memory. The DFT circuitry and the RF transmitter circuitry may be used to form a standard RF module, which can be provided to a number of customers for use in a number of applications. The standard RF module may be adjusted, configured, or both during manufacturing, which may eliminate calibrations, adjustments, or configurations by customers.

29 Claims, 8 Drawing Sheets

DESIGN FOR TESTABILITY CIRCUITRY FOR RADIO FREQUENCY TRANSMITTER CIRCUITRY

FIELD OF THE INVENTION

The present invention relates to radio frequency (RF) transmitter circuitry, which may be used in RF communications systems.

BACKGROUND OF THE INVENTION

With the growth of the wireless communications industry, wireless communications protocols become more sophisticated and demanding in their requirements for complex modulation schemes and narrow channel bandwidths. Transmitter output spectrum requirements become more restrictive and less tolerant of spurious transmissions. Third-generation (3G) and later mobile phone standards may be particularly restrictive. Manufacturing variations of RF transmitter circuitry, which is constructed using traditional fabrication techniques, may not meet RF output and efficiency requirements, including output RF spectrum requirements. Adjusting certain parameters of the RF circuitry may enable the RF transmitter circuitry to meet RF output and efficiency requirements; however, traditionally such adjustments have involved calibration of the RF transmitter circuitry after integration into a final product, such as a cell phone, etc. The calibration adjustments are stored in control circuitry in the final product and provided to the RF transmitter circuitry after power-up and before transmitting.

Manufacturers of RF transmitter modules may need to supply RF modules that can be used in a number of different applications. It may be more economical to produce a single type of RF module, which can be configured for a specific application before shipment to an end user. Additionally, if RF transmitter modules could be produced that meet RF output and efficiency requirements for a specific application, then final product calibrations may be simplified or eliminated. Thus, there is a need for an RF transmitter module that can be adjusted to meet output RF and efficiency requirements, configured for a specific application, and can permanently retain the adjustments and configurations.

SUMMARY OF THE INVENTION

The present invention is design for testability (DFT) circuitry used with RF transmitter circuitry to enable RF parameter adjustments, which provide compliance with requirements, to configure the RF transmitter circuitry for a particular application or range of applications, and to permanently store adjustment information, configuration information, or both, in non-volatile memory. The DFT circuitry and the RF transmitter circuitry may be used to form a standard RF module, which can be provided to a number of customers for use in a number of applications. The standard RF module may be adjusted, configured, or both, during manufacturing, which may eliminate calibrations, adjustments, or configurations by customers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is design for testability (DFT) circuitry used with RF transmitter circuitry to perform RF or other parameter adjustments, which provide compliance with requirements, to configure the RF transmitter circuitry for a particular application or range of applications, and to permanently store adjustment information, configuration information, or both, in non-volatile memory. The DFT circuitry and the RF transmitter circuitry may be used to form a standard RF module, which can be provided to a number of customers for use in a number of applications. The standard RF module may be adjusted, configured, or both, during manufacturing, which may eliminate calibrations, adjustments, or configurations by customers. The adjustments may compensate for manufacturing variations, such as semiconductor process variations, component tolerances, substrate tolerances, attachment variances, wire bonding variances, assembly variances, and the like. The configurations may be used to prepare the RF transmitter circuitry for one or more specific applications. For example, if the RF transmitter circuitry is used in a cell phone that has been manufactured for a specific cellular band, the RF output power may be configured to meet the requirements for that specific cellular band. The non-volatile memory is programmed during manufacturing and needs to retain any adjustment and configuration information for the life of the product. During normal operation, the adjustment and configuration information is used to perform the RF or other parameter adjustments. The non-volatile memory may include fusible links, one-time programmable memory cells, electrically erasable memory cells, other non-volatile technology, or any combination thereof.

Figure 1:
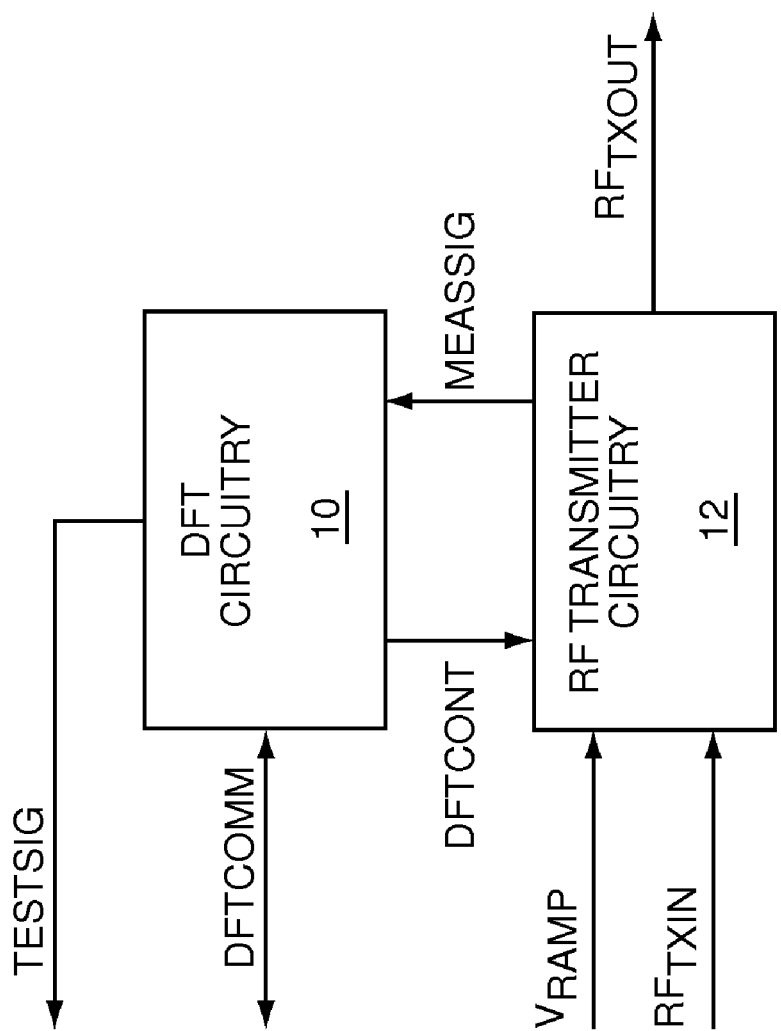
FIG. 1 shows design for testability (DFT) circuitry used with RF transmitter circuitry, according to one embodiment of the present invention.

FIG. 1 shows design for testability (DFT) circuitry 10 used with RF transmitter circuitry 12, according to one embodiment of the present invention. The RF transmitter circuitry 12 receives and amplifies an RF transmitter input signal $RF_{TXIN}$ to provide an RF transmitter output signal $RF_{TXOUT}$. Additionally, the RF transmitter circuitry 12 receives a setpoint signal $V_{RAMP}$, which may be used to control the output voltage of a switching power supply that provides power to a final stage of an RF power amplifier (PA). The DFT circuitry 10 provides DFT control signals DFTCONT to the RF transmitter circuitry 12 to perform RF or other parameter adjustments of the RF transmitter circuitry 12. The RF transmitter circuitry 12 may provide measurement signals MEASSIG to the DFT circuitry 10 to indicate the results of the parameter adjustments. The measurement signals MEASSIG may be analog signals, digital signals, or both, and are indicative of the effects of the parameter adjustments. During manufacturing, the DFT circuitry 10 may communicate with test equipment using bidirectional DFT communications signals DFTCOMM, and may provide test signals TESTSIG to the test equipment that are indicative of the measurement signals MEASSIG and other test parameters. During manufacturing is defined herein as any time before integration of the DFT and RF transmitter circuitry 10, 12 with other circuitry, or during a repair or service process. During normal operation is any time the RF transmitter circuitry 12 is placed in operation by an end user.

Figure 2:
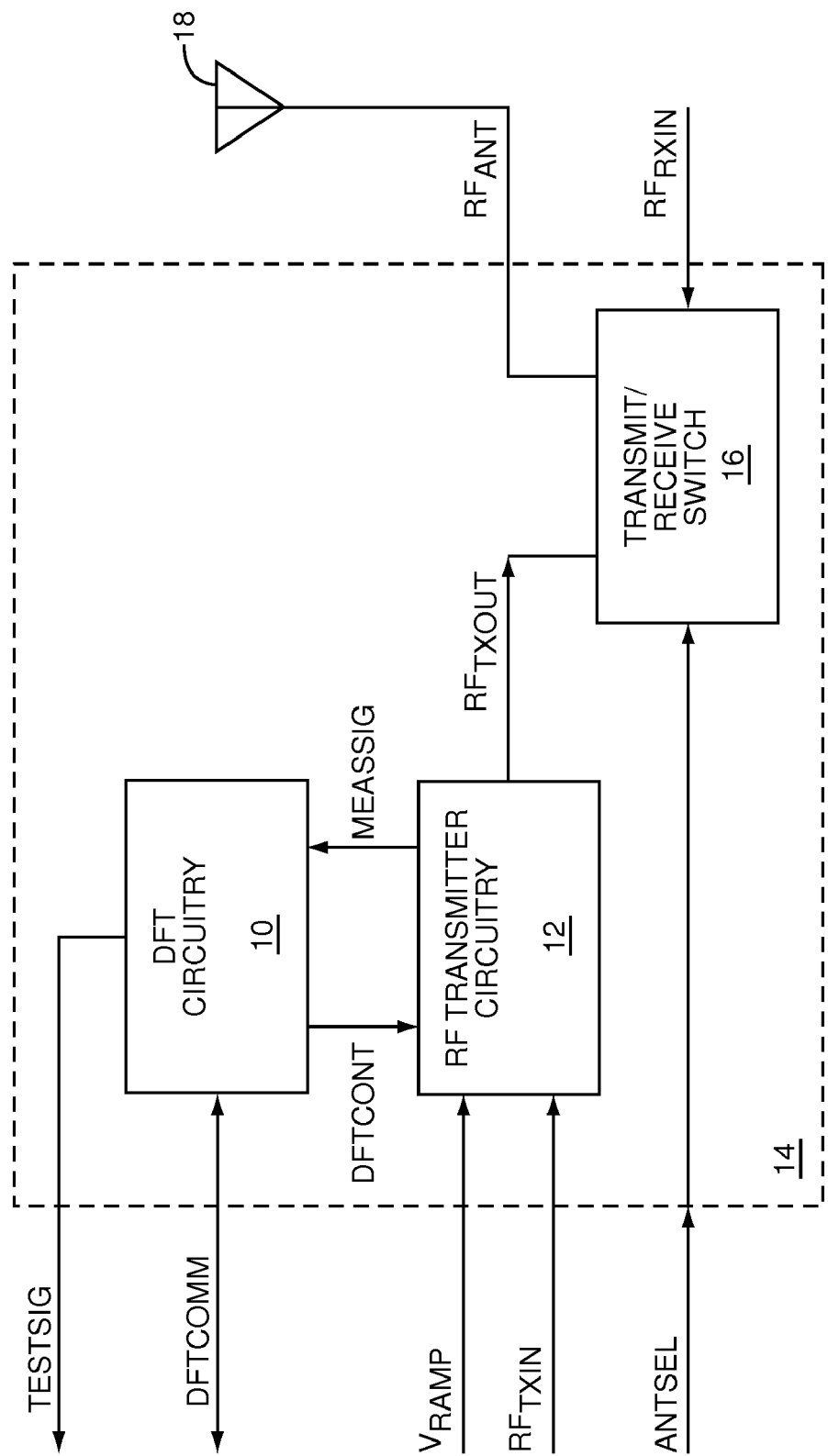
FIG. 2 shows an RF transmitter module, which incorporates the DFT circuitry and the RF transmitter circuitry illustrated in FIG. 1.

FIG. 2 shows an RF transmitter module 14, which incorporates the DFT circuitry 10 and the RF transmitter circuitry 12 illustrated in FIG. 1. The RF transmitter module 14 may include a transmit/receive switch 16, which uses an antenna select signal ANTSEL to route either the RF transmitter output signal $RF_{TXOUT}$ or an RF receiver input signal $RF_{RXIN}$ to an antenna 18, which provides an RF antenna signal $RF_{ANT}$. The RF transmitter module 14 includes transmitter module parameters, which include any parameters or configurations that may be adjusted by the DFT circuitry 10.

Figure 3:
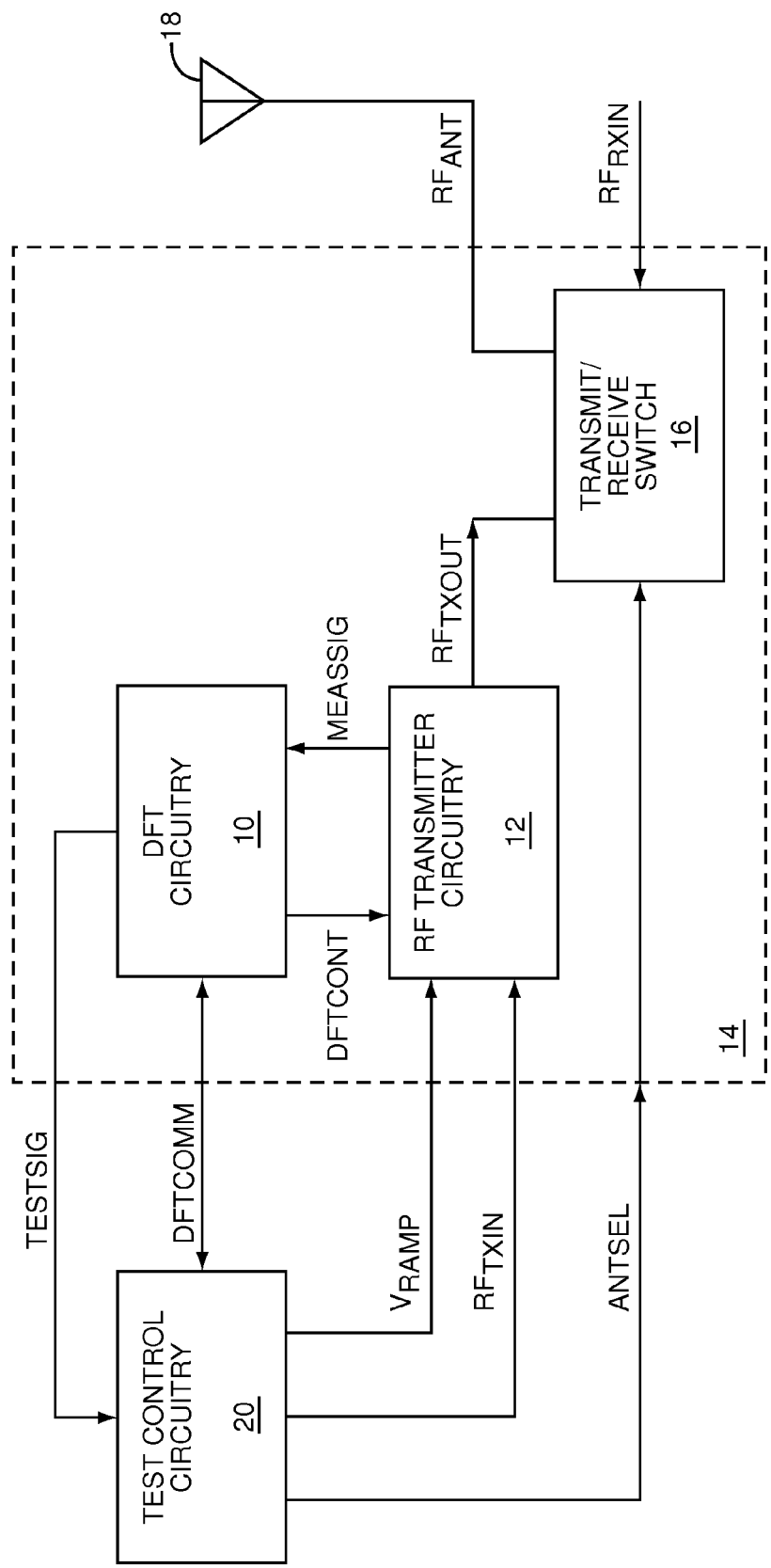
FIG. 3 shows the RF transmitter module being used with test control circuitry.

FIG. 3 shows the RF transmitter module 14 being used with test control circuitry 20. During manufacturing, the test control circuitry 20 is connected to the RF transmitter module 14 to control the DFT circuitry 10. The test control circuitry 20 may provide the setpoint signal $V_{RAMP}$, the RF transmitter input signal $RF_{TXIN}$, the antenna select signal ANTSEL, or any combination thereof, so that the results of transmitter module parameter adjustments may be measured. The DFT circuitry 10 may include registers that can be read from or written to by the test control circuitry 20 using the bidirectional DFT communications signals DFTCOMM. The DFT control signals DFTCONT may be based upon the contents of these registers, the contents of the non-volatile memory, or both. The bidirectional DFT communications signals DFTCOMM may be used to program the contents of the non-volatile memory.

In one embodiment of the present invention, the test control circuitry 20 feeds a unidirectional DFT communications signal to the DFT circuitry 10. The DFT circuitry 10 may include an analog multiplexer to select one or more of the measurement signals MEASSIG to generate the test signals TESTSIG. During manufacturing, the test control circuitry 20 may provide a starting configuration of the transmitter module parameters to the RF transmitter circuitry 12 using the bidirectional DFT communications signals DFTCOMM to program registers in the DFT circuitry 10, which then conveys the configuration information to the RF transmitter circuitry 12 using the DFT control signals DFTCONT. The effects of the test configuration may then be measured by the test control circuitry 20 by examining one or more of the measurement signals MEASSIG via the test signals TESTSIG. If different configurations of the transmitter module parameters are needed, then the process may be repeated as many times as necessary. In one embodiment of the present invention, the bidirectional DFT communications signals DFTCOMM are serial communications signals. The bidirectional DFT communications signals DFTCOMM may share connections to the RF transmitter module 14 with other signals, such as the antenna select signal ANTSEL.

Figure 4:
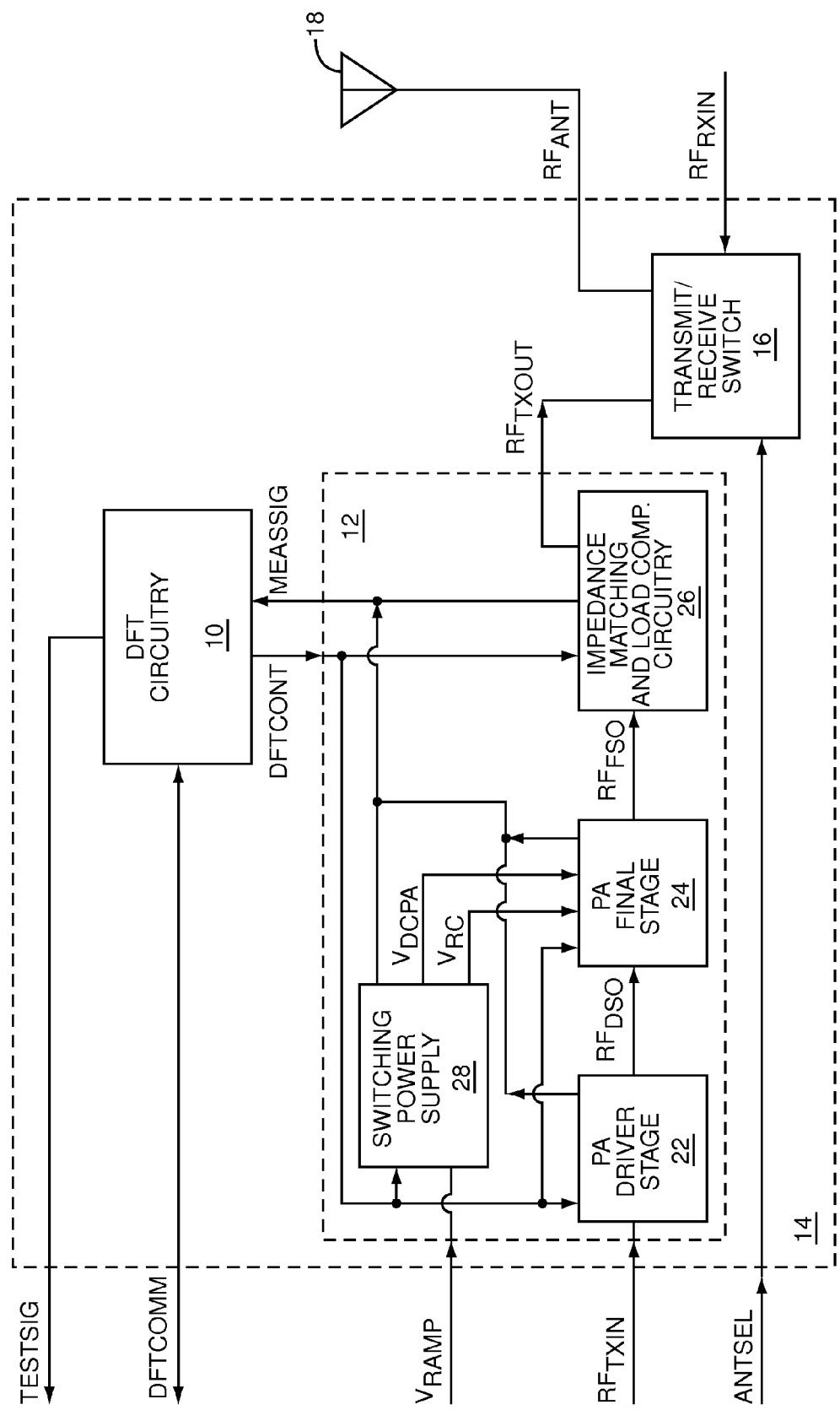
FIG. 4 shows details of the RF transmitter circuitry illustrated in FIG. 1.

FIG. 4 shows details of the RF transmitter circuitry 12 illustrated in FIG. 1. A PA driver stage 22 receives and amplifies the RF transmitter input signal $RF_{TXIN}$ to provide an RF driver stage output signal $RF_{DSO}$ to a PA final stage 24. The PA final stage 24 receives and amplifies the RF driver stage output signal $RF_{DSO}$ to provide an RF final stage output signal $RF_{FSO}$ to impedance matching and load compensation circuitry 26, which matches the impedance between the PA final stage 24 and the antenna 18, and compensates for load variations at the antenna 18. The impedance matching and load compensation circuitry 26 provides the RF transmitter output signal $RF_{TXOUT}$. A switching power supply 28 provides a direct current (DC) PA signal $V_{DCPA}$ to the PA final stage 24 to provide power for amplification. Additionally, the DC PA signal $V_{DCPA}$ may be used to control the amplitude of the RF final stage output signal $RF_{FSO}$. A ripple cancellation signal $V_{RC}$ may be provided from the switching power supply 28 to the PA final stage 24 to compensate for ripple in the DC PA signal $V_{DCPA}$. The DFT control signals DFTCONT may be used to adjust or configure transmitter module parameters in the PA driver stage 22, the PA final stage 24, the impedance matching and load compensation circuitry 26, the switching power supply 28, or any combination thereof. Likewise, the DFT circuitry 10 may receive measurement signals MEASSIG from the PA driver stage 22, the PA final stage 24, the impedance matching and load compensation circuitry 26, the switching power supply 28, or any combination thereof.

The PA final stage 24 may have a low power mode and a high power mode, and selection of either the low power mode or the high power mode may be a transmitter module parameter. The PA final stage 24 may have multiple output power ranges, and selection of the output power range may be a transmitter module parameter, which may be part of bias circuitry in the PA final stage 24. Alternatively, selection of an output power range may be a transmitter module parameter of bias circuitry in the PA driver stage 22. The impedance matching and load compensation circuitry 26 may include multiple ratios of maximum delivered output power to minimum delivered output power under multiple loading conditions. Selection of a maximum delivered output power to minimum delivered output power ratio may be a transmitter module parameter. Selection of a nominal magnitude of the DC PA signal $V_{DCPA}$ may be a transmitter module parameter. The DC PA signal $V_{DCPA}$ may include a number of accuracies, which are selectable as a transmitter module parameter. A nominal switching frequency of the switching power supply 28 may be selectable as a transmitter module parameter. The switching power supply 28 may include a number of different switching frequency accuracies, which may be selectable as a transmitter module parameter.

Figure 5:
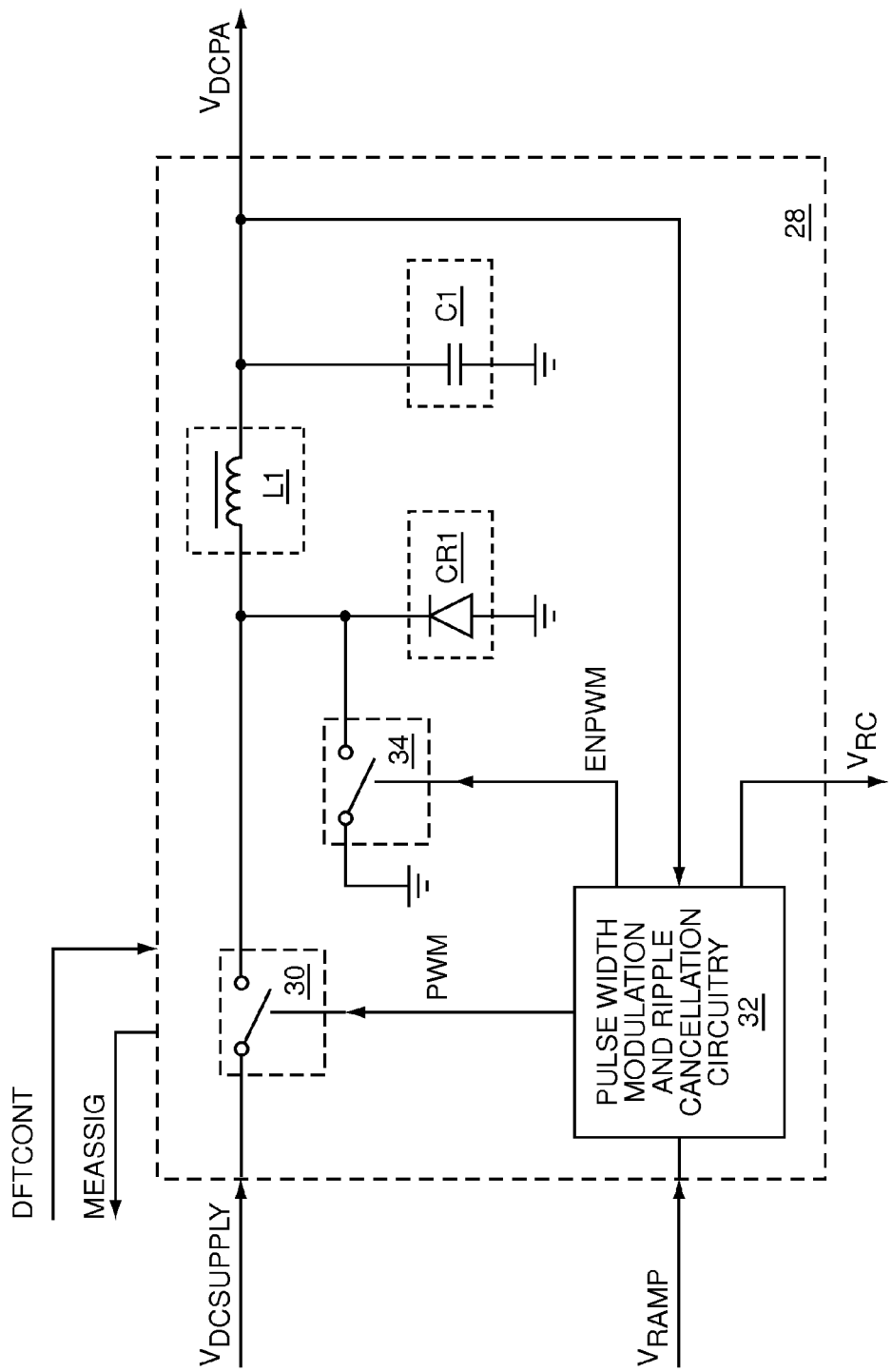
FIG. 5 shows details of the switching power supply illustrated in FIG. 4.

FIG. 5 shows details of the switching power supply 28 illustrated in FIG. 4 arranged in a buck configuration. A buck converter is used when an output voltage from the switching power supply 28 is less than an input voltage to the switching power supply 28. One switched terminal of a first switching element 30 is coupled to an inductive element L1. The other switched terminal of the first switching element 30 receives a DC supply signal $V_{DCSUPPLY}$. A cathode of a diode element CR1 is coupled to the first switching element 30 and the inductive element L1. The other end of the inductive element L1 is coupled to a capacitive element C1 and provides the DC PA signal $V_{DCPA}$. An anode of the diode element CR1 and the capacitive element C1 are coupled to GROUND. Pulse width modulation (PWM) and ripple cancellation circuitry 32 provides a PWM signal PWM to the first switching element 30 and the ripple cancellation signal $V_{RC}$. The PWM and ripple cancellation circuitry 32 receives and regulates the DC PA signal $V_{DCPA}$ by varying the duty-cycle of the PWM signal PWM. A setpoint of the DC PA signal $V_{DCPA}$ is established by the PWM and ripple cancellation circuitry 32 based on the setpoint signal $V_{RAMP}$. The inductive element L1 has an inductor current $I_L$, which supplies a capacitor current $I_C$ to the capacitive element C1, and a load current $I_{LOAD}$ to the PA final stage 24.

The PWM signal PWM is a square-wave signal having a magnitude of either "1" or "0." When the PWM signal PWM is a "1," then the first switching element 30 is closed, which connects the DC supply signal $V_{DCSUPPLY}$ to the cathode of the diode element CR1 and the inductive element L1. In this embodiment of the present invention, the switching power supply 28 is a buck converter; therefore, the voltage of the DC PA signal $V_{DCPA}$ is less than the voltage of the DC supply signal $V_{DCSUPPLY}$, which causes the inductor current $I_L$ to increase. When the PWM signal PWM is a "0," then the first switching element 30 is open, which disconnects the DC supply signal $V_{DCSUPPLY}$ from the cathode of the diode element CR1 and the inductive element L1. The inductor current $I_L$ forward biases the diode element CR1; therefore, the voltage across the inductive element L1 will be equal to a diode drop plus the voltage of the DC PA signal $V_{DCPA}$ with a polarity that is opposite to the polarity when the first switching element 30 is closed, which causes the inductor current $I_L$ to decrease. By varying the duty-cycle of the PWM signal PWM, the portion of a switching cycle in which the inductor current $I_L$ is increasing versus decreasing can be varied, thereby regulating the voltage of the DC PA signal $V_{DCPA}$.

In one embodiment of the present invention, the diode element CR1 may be coupled in parallel with a second switching element 34. When enabled, the second switching element 34 is normally closed when the first switching element 30 is open, and vice versa. The second switching element 34 may be a metal oxide semiconductor (MOS), or other type of transistor element, which may have a lower voltage drop than the diode element CR1; however, the circuitry used to drive the second switching element 34 may consume more power than the power saved by the reduced voltage drop, particularly under low output power conditions. Therefore, enabling usage of the second switching element 34 may be a configurable transmitter module parameter. The PWM and ripple cancellation circuitry 32 provides an enabled PWM signal ENPWM to the second switching element 34, which is approximately an inverse of the PWM signal PWM when enabled. A switching power supply using such a dual switch arrangement is called a synchronous switching power supply. Additional circuitry may be added to prevent both switches from being closed simultaneously or open simultaneously for very long.

The first and second switching elements 30, 34 may include segmented transistor elements, which have transistor segments that can be selectively enabled or disabled. In high power applications, many or all of the segments may need to be enabled; however, in low power applications, it may be desirable to disable at least one segment to save power. Enabling or disabling transistor segments may be a configurable transmitter module parameter. The switching power supply 28 may incorporate ripple control features that have configurable transmitter module parameters. The ripple cancellation signal $V_{RC}$ may be compensated for manufacturing variations, or may be based on other configuration parameters, or both. Examples of other configuration parameters include RF output power, the magnitude of the setpoint signal $V_{RAMP}$, and the switching frequency. The switching frequency may be dithered to spread frequency content of ripple in the DC PA signal $V_{DCPA}$. Configurable transmitter module parameters related to frequency dithering may include, but are not limited to, dithering frequency, number of different switching frequencies, maximum switching frequency, minimum switching frequency, selection of frequency dithering algorithms, such as triangular or pseudo-random, compensation of propagation delays, and compensation for manufacturing variations.

Other embodiments of the present invention may use a boost converter, or a combination of a buck converter and a boost converter. A boost converter is used when an output voltage from the switching power supply 28 is greater than an input voltage to the switching power supply 28. The PWM signal PWM may have an active supply state, in which energy is allowed to be transferred from the DC supply signal $V_{DCSUPPLY}$ to the inductive element L1, and an inactive supply state in which energy is not allowed to be transferred from the DC supply signal $V_{DCSUPPLY}$ to the inductive element L1. In a boost configuration (not shown), the PWM signal PWM may have an active load state, in which energy is allowed to be transferred from an energy transfer element to a load, and an inactive load state, in which energy is not allowed to be transferred from an energy transfer element to a load. Alternate embodiments of the present invention may use any combination of supply states and load states.

Figure 6:
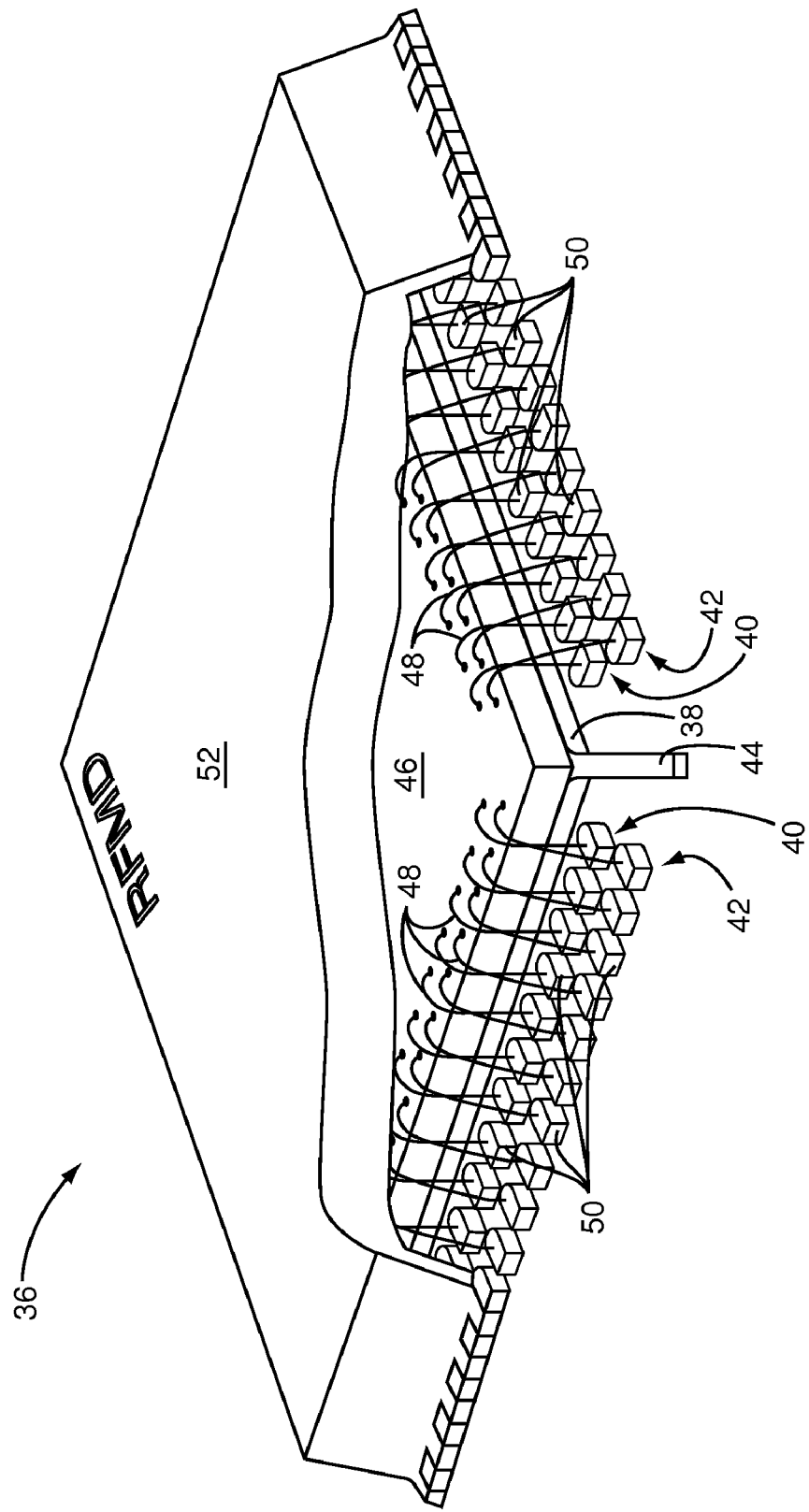
FIG. 6 shows a packaged RF transmitter module according to one embodiment of the present invention.

With reference to FIG. 6, a perspective view of a packaged RF transmitter module 36 is shown, not to scale. In particular, a dual row quad (four sided) flat no-lead (QFN) semiconductor device package is illustrated. The packaged RF transmitter module 36 is fabricated on a lead frame that provides a die or substrate attach pad 38, an inside row of contact pads 40, and an outside row of contact pads 42. Tie bars 44 located in each corner of the die or substrate attach pad 38 are used to help secure the lead frame strip in place. A semiconductor die 46 resides on top of the die or substrate attach pad 38. Wire bonds 48 couple bond pads (not shown) from various devices on the semiconductor die 46 to contact pads 50 within the inside row of contact pads 40 and the outside row of contact pads 42. An overmold body 52 is formed over the semiconductor device package, covering the die 46, die attach pad 38, wire bonds 48, inside row of contact pads 40, and a portion of the outside row of contact pads 42. As illustrated, a portion of the outside row of contact pads 42 remains exposed. The die or substrate attach pad 38, the inside row of contact pads 40, and the outside row of contact pads 42 are held together by the overmold body 52.

Figure 7:
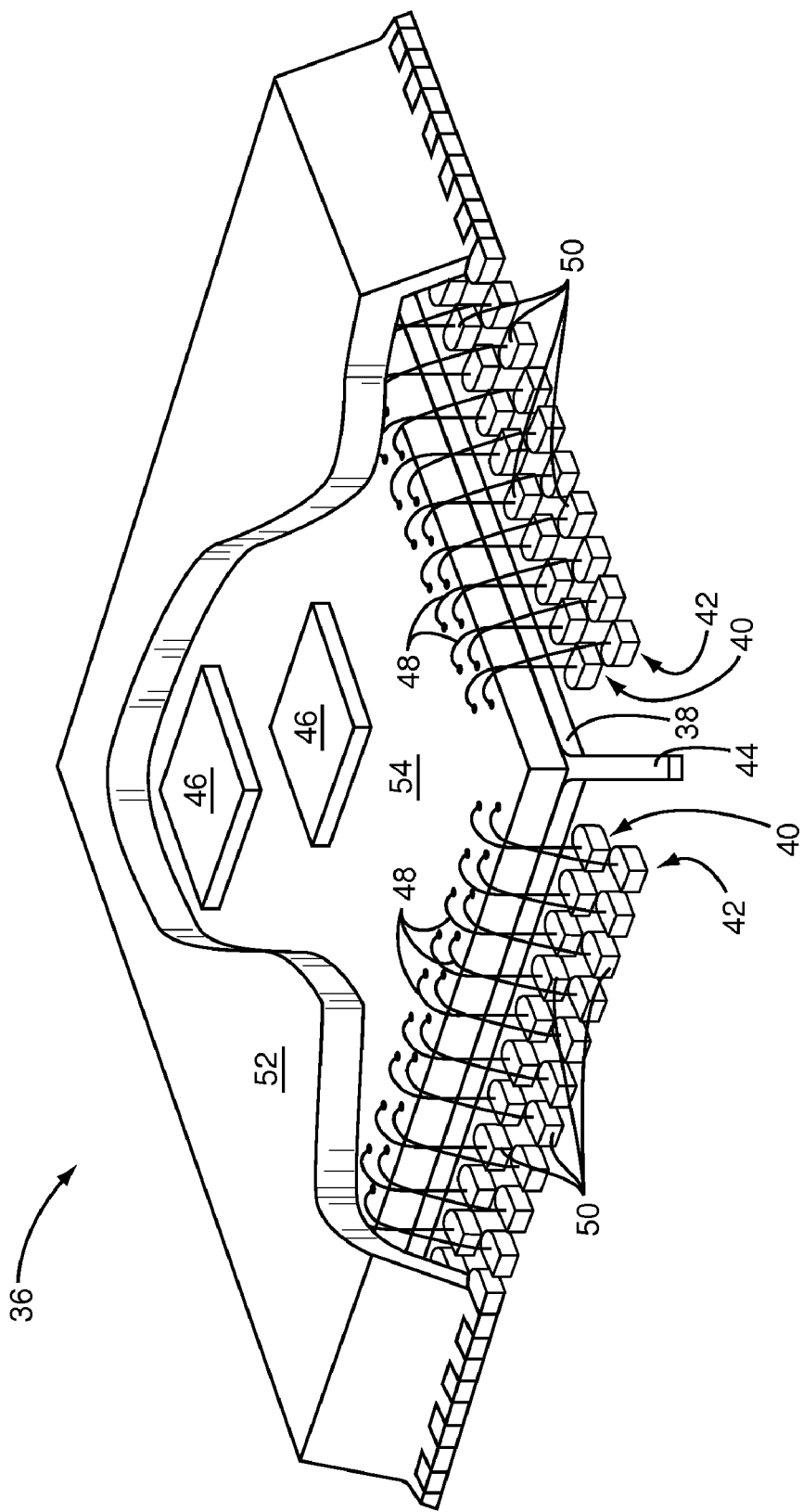
FIG. 7 shows a packaged RF transmitter module according to an alternate embodiment of the present invention.

In one embodiment of the present invention, the RF transmitter module 14 is provided by the semiconductor die 46. An alternate embodiment of the present invention is illustrated in FIG. 7, not to scale. The single semiconductor die 46 is replaced with multiple semiconductor dies 46, which may be mounted to a substrate 54. The RF transmitter module 14 may be provided by any combination of the semiconductor dies 46. At least one of the semiconductor dies 46 may include Gallium Arsenide (GaAs), any GaAs die may utilize pseudomorphic High Electron Mobility Transistor (pHEMT) technology, at least one of the semiconductor dies 46 may include Silicon (Si), or any combination thereof. In an exemplary embodiment of the present invention, the PA driver stage 22, the PA final stage 24, the transmit/receive switch 16, and the impedance matching and load compensation circuitry 26 are provided by a GaAs die, and the transmit/receive switch 16 uses pHEMT technology. The switching power supply 28 is provided by an Si die.

Figure 8:
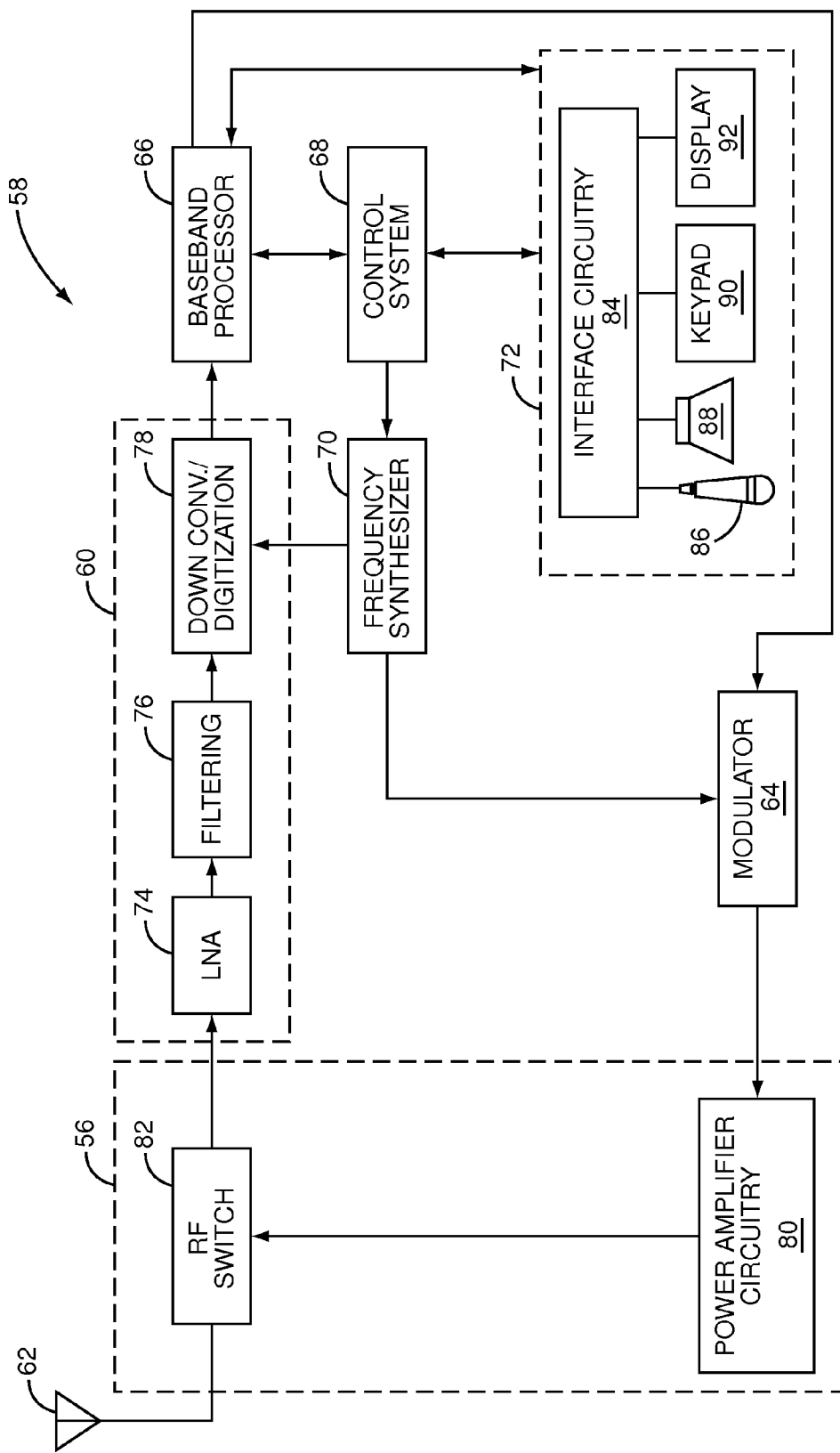
FIG. 8 shows an application example of the present invention used in a mobile terminal.

An application example of an RF transmitter module 56 is its use in a mobile terminal 58, the basic architecture of which is represented in FIG. 8. The mobile terminal 58 may include a receiver front end 60, the RF transmitter module 56, an antenna 62, a modulator 64, a baseband processor 66, a control system 68, a frequency synthesizer 70, and an interface 72. The receiver front end 60 receives information bearing radio frequency signals from one or more remote transmitters provided by a base station (not shown). A low noise amplifier (LNA) 74 amplifies the signal. A filter circuit 76 minimizes broadband interference in the received signal, while down conversion and digitization circuitry 78 down converts the filtered, received signal to an intermediate or baseband frequency signal, which is then digitized into one or more digital streams. The receiver front end 60 typically uses one or more mixing frequencies generated by the frequency synthesizer 70. The baseband processor 66 processes the digitized received signal to extract the information or data bits conveyed in the received signal. This processing typically comprises demodulation, decoding, and error correction operations. As such, the baseband processor 66 is generally implemented in one or more digital signal processors (DSPs).

On the transmit side, the baseband processor 66 receives digitized data, which may represent voice, data, or control information, from the control system 68, which it encodes for transmission. The encoded data is output to the modulator 64, which modulates a carrier signal that is at a desired transmit frequency and feeds power amplifier circuitry 80 in the RF transmitter module 56. The power amplifier circuitry 80 amplifies the modulated carrier signal to a level appropriate for transmission, and delivers the amplified and modulated carrier signal to the antenna 62 through an RF switch 82.

A user may interact with the mobile terminal 58 via the interface 72, which may include interface circuitry 84 associated with a microphone 86, a speaker 88, a keypad 90, and a display 92. The interface circuitry 84 typically includes analog-to-digital converters, digital-to-analog converters, amplifiers, and the like. Additionally, it may include a voice encoder/decoder, in which case it may communicate directly with the baseband processor 66. The microphone 86 will typically convert audio input, such as the user's voice, into an electrical signal, which is then digitized and passed directly or indirectly to the baseband processor 66. Audio information encoded in the received signal is recovered by the baseband processor 66, and converted by the interface circuitry 84 into an analog signal suitable for driving the speaker 88. The keypad 90 and display 92 enable the user to interact with the mobile terminal 58, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. Radio frequency (RF) circuitry comprising:
   non-volatile memory having fusible links wherein the non-volatile memory is programmable by the fusible links and the fusible links are configured in accordance with design for testability (DFT) configuration data that is provided during manufacturing;
   DFT circuitry adapted to provide at least one DFT control signal based on the DFT configuration data; and
   RF transmitter circuitry adapted to:
      select at least one transmitter parameter of the RF transmitter circuitry based on the at least one DFT control signal;
      receive an RF transmit input signal; and
      provide an RF transmit output signal based on amplifying the RF TX input signal and based on the at least one transmitter parameter.

2. The RF circuitry of claim 1 wherein the RF transmitter circuitry comprises a power amplifier having a low power mode and a high power mode, and to select the at least one transmitter parameter, the RF transmitter circuitry is further adapted to select one of the low power mode and the high power mode during normal operation.

3. The RF circuitry of claim 1 wherein the RF transmitter circuitry comprises a power amplifier having bias circuitry, which provides a plurality of output power ranges from the power amplifier, such that to select the at least one transmitter parameter, the RF transmitter circuitry is further adapted to select one of the plurality of output power ranges during normal operation.

4. The RF circuitry of claim 1 wherein the RF transmitter circuitry comprises impedance matching and load compensation circuitry, which provides a plurality of maximum delivered output power to minimum delivered output power ratios under a plurality of loading conditions, such that to select the at least one transmitter parameter, the RF transmitter circuitry is further adapted to select one of the plurality of ratios during normal operation.

5. The RF circuitry of claim 1 wherein the RF transmitter circuitry comprises a power amplifier and a switching power supply adapted to provide one of a plurality of nominal supply voltages to the power amplifier, and to select the at least one transmitter parameter, the RF transmitter circuitry is further adapted to select one of the plurality of nominal supply voltages during normal operation.

6. The RF circuitry of claim 1 wherein the RF transmitter circuitry comprises a power amplifier and a switching power supply adapted to provide a supply voltage, which has a plurality of supply voltage accuracies to the power amplifier, and to select the at least one transmitter parameter, the RF transmitter circuitry is further adapted to select one of the plurality of supply voltage accuracies during normal operation.

7. The RF circuitry of claim 1 wherein the RF transmitter circuitry comprises a switching power supply adapted to operate at one of a plurality of nominal switching frequencies, and to select the at least one transmitter parameter, the RF transmitter circuitry is further adapted to select one of the plurality of nominal switching frequencies during normal operation.

8. The RF circuitry of claim 1 wherein the RF transmitter circuitry comprises a switching power supply adapted to operate at a switching frequency having a plurality of switching frequency accuracies, and to select the at least one transmitter parameter, the RF transmitter circuitry is further adapted to select one of the plurality of switching frequency accuracies during normal operation.

9. The RF circuitry of claim 1 wherein the RF transmitter circuitry comprises a switching power supply comprising a plurality of selectively enabled switching transistor segments, which are allowed to be disabled, and to select the at least one transmitter parameter, the RF transmitter circuitry is further adapted to select at least one of the plurality of switching transistor segments during normal operation.

10. The RF circuitry of claim 1 wherein the RF transmitter circuitry comprises a switching power supply comprising at least one diode element coupled in parallel with at least one switching transistor element, which is allowed to be disabled, and to select the at least one transmitter parameter, the RF transmitter circuitry is further adapted to select at least one of the at least one switching transistor element during normal operation.

11. The RF circuitry of claim 1 wherein the RF transmitter circuitry comprises a switching power supply comprising frequency dithering circuitry having a plurality of frequency dithering configurations, and to select the at least one transmitter parameter, the RF transmitter circuitry is further adapted to select one of the plurality of frequency dithering configurations during normal operation.

12. The RF circuitry of claim 1 wherein to select the at least one transmitter parameter compensates for manufacturing variations in the RF transmitter circuitry.

13. The RF circuitry of claim 1 wherein to select the at least one transmitter parameter configures the RF transmitter circuitry for a specific application.

14. The RF circuitry of claim 1 wherein the DFT circuitry is further adapted to:
   receive a DFT communications input signal from manufacturing test equipment during manufacturing; and
   program the fusible links of the non-volatile memory during manufacturing with the DFT configuration data, which is provided by the DFT communications input signal.

15. The RF circuitry of claim 14 wherein the DFT communications input signal is a serial communications signal.

16. The RF circuitry of claim 14 wherein the DFT circuitry comprises at least one node, which is adapted to share the DFT communications input signal with at least one other signal.

17. The RF circuitry of claim 14 wherein:
   the DFT circuitry further comprises at least one DFT register, which is programmed with the DFT configuration data during manufacturing based on the DFT communications input signal;
   the at the least one DFT control signal is further based on the DFT configuration data stored in the at least one DFT register; and
   to select the at least one transmitter parameter of the RF transmitter circuitry is further based on the at least one DFT control signal, which is based on the DFT configuration data stored in the at least one DFT register.

18. The RF circuitry of claim 17 wherein the DFT circuitry is further adapted to provide a DFT communications output signal to the manufacturing test equipment during manufacturing based on contents of at least one of the at least one DFT register and the non-volatile memory.

19. The RF circuitry of claim 17 wherein the DFT circuitry is further adapted to:
   receive at least one measurement signal during manufacturing from the RF transmitter circuitry based on the at least one transmitter parameter; and
   provide at least one of the at least one measurement signal during manufacturing to the manufacturing test equipment.

20. The RF circuitry of claim 17 wherein the DFT circuitry is further adapted to provide a DFT communications output signal to the manufacturing test equipment during manufacturing based on contents of at least one of the at least one DFT register and the non-volatile memory.

21. The RF circuitry of claim 1 wherein the RF circuitry is provided by a single semiconductor die.

22. The RF circuitry of claim 1 wherein the RF circuitry is provided by at least one semiconductor die mounted to a common substrate.

23. The RF circuitry of claim 1 wherein the RF circuitry is used to form an RF transmitter module.

24. A method comprising:
   providing design for testability (DFT) configuration data to non-volatile memory having fusible links during manufacturing by configuring the fusible links;
   providing at least one DFT control signal based on the DFT configuration data;
   selecting transmitter parameters of radio frequency (RF) transmitter circuitry based on the at least one DFT control signal;
   receiving an RF transmit (TX) input signal; and
   providing an RF TX output signal based on amplifying the RF TX input signal and based on the transmitter parameters.

25. Radio frequency (RF) circuitry comprising:
   non-volatile memory having design for testability (DFT) configuration data that is provided during manufacturing;
   DFT circuitry adapted to provide at least one DFT control signal based on the DFT configuration data; and
   RF transmitter circuitry adapted to:
      select at least one transmitter parameter of the RF transmitter circuitry based on the at least one DFT control signal;
      receive an RF transmit input signal;
      provide an RF transmit output signal based on amplifying the RF TX input signal and based on the at least one transmitter parameter; and
   wherein the RF transmitter circuitry comprises impedance matching and load compensation circuitry, which provides a plurality of maximum delivered output power to minimum delivered output power ratios under a plurality of loading conditions, such that to select the at least one transmitter parameter, the RF transmitter circuitry is further adapted to select one of the plurality of ratios during normal operation.

26. Radio frequency (RF) circuitry comprising:
   non-volatile memory having design for testability (DFT) configuration data that is provided during manufacturing;
   DFT circuitry adapted to provide at least one DFT control signal based on the DFT configuration data; and
   RF transmitter circuitry adapted to:
      select at least one transmitter parameter of the RF transmitter circuitry based on the at least one DFT control signal;
      receive an RF transmit input signal;
      provide an RF transmit output signal based on amplifying the RF TX input signal and based on the at least one transmitter parameter; and
   wherein the RF transmitter circuitry comprises a switching power supply comprising at least one diode element coupled in parallel with at least one switching transistor element, which is allowed to be disabled, and to select the at least one transmitter parameter, the RF transmitter circuitry is further adapted to select at least one of the at least one switching transistor element during normal operation.

27. Radio frequency (RF) circuitry comprising:
   non-volatile memory having design for testability (DFT) configuration data that is provided during manufacturing;

DFT circuitry adapted to provide at least one DFT control signal based on the DFT configuration data wherein the DFT circuitry further comprises:
- at least one DFT register, which is programmed with the DFT configuration data during manufacturing based on the DFT communications input signal;
- the at the least one DFT control signal is further based on the DFT configuration data stored in the at least one DFT register;

RF transmitter circuitry adapted to:
- receive a DFT communications input signal from manufacturing test equipment during manufacturing;
- program the non-volatile memory during manufacturing with the DFT configuration data, which is provided by the DFT communications input signal;
- select at least one transmitter parameter of the RF transmitter circuitry based on the at least one DFT control signal;
- receive an RF transmit input signal; and
- provide an RF transmit output signal based on amplifying the RF TX input signal and based on the at least one transmitter parameter.

28. Radio frequency (RF) circuitry comprising:

non-volatile memory having design for testability (DFT) configuration data that is provided during manufacturing;

DFT circuitry adapted to provide at least one DFT control signal based on the DFT configuration data; and RF transmitter circuitry adapted to:
- select at least one transmitter parameter of the RF transmitter circuitry based on the at least one DFT control signal;
- receive an RF transmit input signal;
- provide an RF transmit output signal based on amplifying the RF TX input signal and based on the at least one transmitter parameter; and wherein the RF transmitter circuitry comprises a power amplifier and a switching power supply adapted to provide one of a plurality of nominal supply voltages to the power amplifier, and to select the at least one transmitter parameter, the RF transmitter circuitry is further adapted to select one of the plurality of nominal supply voltages during normal operation.

29. Radio frequency (RF) circuitry comprising:

non-volatile memory having design for testability (DFT) configuration data that is provided during manufacturing;

DFT circuitry adapted to provide at least one DFT control signal based on the DFT configuration data; and RF transmitter circuitry adapted to:
- select at least one transmitter parameter of the RF transmitter circuitry based on the at least one DFT control signal;
- receive an RF transmit input signal;
- provide an RF transmit output signal based on amplifying the RF TX input signal and based on the at least one transmitter parameter; and wherein the RF transmitter circuitry comprises a switching power supply comprising frequency dithering circuitry having a plurality of frequency dithering configurations, and to select the at least one transmitter parameter, the RF transmitter circuitry is further adapted to select one of the plurality of frequency dithering configurations during normal operation.

* * * * *